United States Patent
Perrine

(10) Patent No.: US 8,138,262 B2
(45) Date of Patent: Mar. 20, 2012

(54) WATERBORNE, RADIATION-CURABLE COATING COMPOSITIONS AND RELATED METHODS

(75) Inventor: M. Lisa Perrine, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 11/562,069

(22) Filed: Nov. 21, 2006

(65) Prior Publication Data

US 2008/0139708 A1 Jun. 12, 2008

(51) Int. Cl.
*C08F 220/06* (2006.01)
*C08F 2/16* (2006.01)
*C08L 31/00* (2006.01)
*C08L 35/00* (2006.01)
*C09K 3/00* (2006.01)

(52) U.S. Cl. ........ 524/832; 524/800; 524/801; 524/804; 524/833; 252/183.11

(58) Field of Classification Search .................. 524/801, 524/804, 800, 832, 833; 252/183.11
See application file for complete search history.

(56) References Cited

U.S. PATENT DOCUMENTS

| 5,045,435 A | 9/1991 | Adams et al. ............... 430/288 |
| 5,530,043 A | 6/1996 | Zawacky et al. ............ 524/317 |
| 5,738,916 A | 4/1998 | Noguchi et al. ............ 427/511 |
| 5,753,756 A | 5/1998 | Aerts et al. ................ 525/111.5 |
| 5,869,220 A | 2/1999 | Hallock et al. ............ 430/281.1 |
| 2003/0175437 A1* | 9/2003 | Tsuda et al. ............... 427/385.5 |
| 2005/0176874 A1 | 8/2005 | Panades et al. ............ 524/556 |
| 2005/0192400 A1 | 9/2005 | Killilea et al. ............. 524/591 |

FOREIGN PATENT DOCUMENTS

| EP | 0 295 944 A2 | 12/1988 |
| EP | 1359173 A1 * | 11/2003 |
| WO | WO 2005058995 A1 * | 6/2005 |

OTHER PUBLICATIONS

H. K. Hall, Oct. 1957, JACS, 79, 5441-5444.*
Hall, 1957, J. Am. Chem. Soc., 79(20), 5441-5444.*
"Amine Solubilizers for Water-Soluble Acrylic Coatings" by Zeno W. Wicks, Jr. et al., North Dakota State University, Journal of Coatings Technology, vol. 50, No. 638, Mar. 1978, pp. 39-46.

* cited by examiner

*Primary Examiner* — Karuna P Reddy
(74) *Attorney, Agent, or Firm* — Donald R. Palladino

(57) ABSTRACT

Disclosed are waterborne, radiation-curable coating compositions. These coating compositions include a water-dispersible polymer and a hydrophobic multi-functional ethylenically unsaturated compound. The compositions are characterized by being viscosity stable at elevated temperatures and alkaline conditions.

19 Claims, No Drawings

WATERBORNE, RADIATION-CURABLE COATING COMPOSITIONS AND RELATED METHODS

FIELD OF THE INVENTION

The present invention relates to waterborne, radiation-curable coating compositions. These coating compositions comprise a water dispersible polymer and a hydrophobic multifunctional ethylenically unsaturated compound and are characterized by being viscosity stable at elevated temperatures and alkaline conditions.

BACKGROUND INFORMATION

Thermally cured solvent-based and water-based coatings have been widely available. A disadvantage of solvent-based coatings is a high VOC (volatile organic compound) content compared to water-based coatings. Additionally, both solvent-based and water-based thermal cure coatings, as compared to ultraviolet ("UV") light curable coatings, can have slow rates of cure, due, in at least some cases, to a slow rate of reaction for the crosslinkers that are used. UV-curable systems often provide a much faster reaction because a UV light with certain frequencies is used to form radicals from a photoinitiator that crosslinks the vinyl groups on the resin. The UV light curing reaction can take place within a few seconds as opposed to a thermal curing reaction that can take significantly longer, including several minutes or more.

UV-curable, water-based coatings can be used in some cases. Often, in addition to radiation curable materials, these coatings often include a water dispersible polymer, such as an acid functional acrylic or polyester, which is neutralized in water with an amine. Because little or no heat is required to cure a UV-curable water-based coating, they can be applied to heat sensitive substrates, such as cellulosics and plastics.

One disadvantage that has been associated with UV-curable, water-based coating compositions is that they often exhibit poor pH and viscosity stability under the alkaline conditions that are often desirable or necessary. Often, under these conditions, the radiation curable materials, such as multi-functional (meth)acrylates, that are present hydrolyze in the presence of water, which leads to an undesired increase in the viscosity of the composition over time.

As a result, it would be desirable to provide waterborne, radiation-curable coating compositions that are viscosity stable under alkaline conditions.

SUMMARY OF THE INVENTION

In certain respects, the present invention is directed to waterborne, radiation-curable coating compositions. These compositions comprise (a) a water dispersible polymer; (b) a hydrophobic multi-functional ethylenically unsaturated compound; and (c) a neutralizing agent comprising predominantly a monofunctional tertiary amine having a $pK_a$ of no more than 9.5.

In other respects, the present invention is directed to waterborne, radiation curable coating compositions comprising an acid functional polymer and a hydrophobic multi-functional ethylenically unsaturated compound, wherein the composition is viscosity stable for at least 28 days at 120° F. when neutralized to a pH of from 7 to 9.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to "waterborne" coating compositions. As used herein, the term "waterborne" coating composition refers to compositions wherein the solvent or carrier fluid primarily or principally comprises water. For example, in certain embodiments of the present invention, the carrier fluid is at least 80 weight percent water. In certain embodiments, in addition to water, the aqueous medium may further comprise an organic solvent, such as, for example, alcohols with up to about 8 carbon atoms, such as methanol, isopropanol, and the like; or glycol ethers, such as the monoalkyl ethers of ethylene glycol, diethylene glycol, or propylene glycol, and the like. When present, organic solvents are typically used in amounts up to about ten percent by volume, based on the total volume of aqueous medium.

In addition, certain embodiments of the present invention are directed to coating compositions that are "low VOC" coating compositions. As used herein, the term "low VOC composition" means that the composition contains no more than three (3) pounds of volatile organic compounds per gallon of the composition. In certain embodiments, the coating compositions of the present invention comprise no more than one (1) pound of volatile organic compound per gallon of the coating composition. As used herein, the term "volatile organic compound" refers to compounds that have at least one carbon atom and which are released from the composition during drying and/or curing thereof. Examples of "volatile organic compounds" include, but are not limited to, alcohols, benzenes, toluenes, chloroforms, and cyclohexanes.

As also indicated, the waterborne coating compositions of the present invention are "radiation-curable". As used herein, the term "radiation-curable" refers to compositions that include a compound having reactive components that are polymerizable by exposure to an energy source, such as an electron beam (EB), UV light, or visible light. Examples of radiation curable compounds include those that contain ethylenic unsaturation, such as acrylate or methacrylate groups, fumarate groups, vinyl ether groups, maleate groups, thiol groups, alkenes, epoxies and the like.

As previously indicated, the waterborne, radiation-curable coating compositions of the present invention comprise a water dispersible polymer. As used herein, the term "water dispersible polymer" refers to a polymer than is capable of being stably dispersed in water with or without the aid or use of a surfactant. In certain embodiments, the water dispersible polymer utilized in the coating compositions of the present invention is capable of being stably dispersed in water without the aid or use of a significant amount, i.e., no more than 1 percent by weight based on the weight of the polymer, of surfactant.

Suitable water dispersible polymers include polyurethanes, epoxies, polyamides, chlorinated polyolefins, acrylics, oil-modified polymers, as well as mixtures or copolymers thereof. Such polymers can be readily synthesized and made to be water dispersible using conventional techniques. In certain embodiments, for example, the incorporation of acid functionality produces water dispersibility. As a result, in certain embodiments, the water dispersible polymer included in the compositions of the present invention comprises an acid functional polymer.

The acid functionality incorporated onto such polymers is, in certain embodiments, carboxylic acid, though, in other embodiments, other acids, such as sulfonic acid, may be used. In certain embodiments, the acid functional polymer has at least two carboxyl groups per molecule.

Suitable acid functional polymers include, but are not limited to, acid functional acrylic polymers, polyolefins, epoxies, polyamides, and polyurethanes, including mixtures thereof. In certain embodiments, the acid functional polymer included in the coating compositions of the present invention has an acid number of from 5 to 50, such as 5 to 30.

Carboxylic acid-functional acrylic polymers that are suitable for use in the present invention can be prepared by free radical polymerization methods that are known to those of ordinary skill in the art. In certain embodiments, such a polymer is prepared by polymerizing one or more carboxylic acid functional ethylenically unsaturated monomers, e.g., (meth) acrylic acid, with one or more ethylenically unsaturated monomers that are free of carboxylic acid functionality, e.g., methyl(meth)acrylate, isobornyl(meth)acrylate, butyl(meth) acrylate and styrene. Alternatively, such a carboxylic acid functional acrylic polymer may be prepared by first preparing a hydroxy functional acrylic polymer that is then reacted with a cyclic anhydride, e.g., succinic anhydride. Additionally suitable ethylenically unsaturated monomers are functional monomers that can supply crosslinking moieties for thermosetting polymers, such as acrylic acid, methacrylic acid, and hydroxy functional acrylates and methacrylates, such as hydroxyethyl acrylate, hydroxyethyl methacrylate, hydroxypropyl acrylate, and hydroxypropyl methacrylate.

In certain embodiments, the coating compositions of the present invention comprise a self-crosslinking acrylic polymer, such as an acrylic polymer with acetoacetoxy-type functional moieties, as described, for example, in United States Patent Application Publication No. 2005/0176874A1 at [0001] to [0049], the cited portion of which being incorporated herein by reference.

Acid functional acrylic polymers can, for example, be prepared by solution polymerization techniques known to those skilled in the art. Generally, the monomer(s) are polymerized in the presence of a suitable free radical initiating catalyst, such as an organic peroxide or azo compound, for example benzoyl peroxide, t-butyl perbenzoate, or N,N'-azobis-(isobutyronitrile). The amount of catalyst can vary widely depending upon the particular polymerization conditions. In certain embodiments, the monomer(s) are polymerized in the presence of an organic solvent such as an alcohol, an aromatic solvent, a ketone, and/or a glycol. The solvent(s) are selected such that they solubilize the monomers and can be readily removed by distillation at the completion of the polymerization.

Polyurethanes having carboxylic acid functionality are also suitable for use in the present invention and can be prepared, as will be appreciated by those skilled in the art, by reacting one or more isocyanates with one or more hydroxy-functional compounds. Suitable water-dispersible polyurethanes, and methods for their preparation, are described in United States Published Patent Application No. 2005/0192400A1 at [0041] to [0047] and [0055], the cited portion of which being incorporated herein by reference.

Polyesters having carboxylic acid functionality may, in certain embodiments, also be suitable for use in the present invention and may be prepared by art-recognized methods, which include reacting carboxylic acids (and/or esters thereof) having acid (or ester) functionalities of at least 2, and polyols having hydroxy functionalities of at least 2. As is known to those of ordinary skill in the art, the molar equivalents ratio of carboxylic acid groups to hydroxy groups of the reactants is selected such that the resulting polyester has carboxylic acid functionality and the desired molecular weight.

In certain embodiments, the acid functional polymer is present in the coating compositions of the present invention in an amount of from 5 percent to 50 percent by weight, such as 7 to 40 percent by weight, with the weight percent being based on the total weight of the coating composition.

As previously indicated, the waterborne coating compositions of the present invention also comprise a hydrophobic multi-functional ethylenically unsaturated compound. As used herein, the term "hydrophobic ethylenically unsaturated compound" refers to ethylenically unsaturated compounds that are essentially not compatible with, do not have an affinity for, and/or are not capable of dissolving in water using conventional mixing means. That is, upon mixing a sample of the compound with an organic component and water, a majority of the polymer is in the organic phase and a separate aqueous phase is observed. See Hawley's Condensed Chemical Dictionary, (12th Ed. 1993) at page 618.

As used herein, the term "multi-functional ethylenically unsaturated compound" refers to compounds containing two or more sites of ethylenic unsaturation per molecule. Specific examples of which include, but are not limited to, bifunctional ethylenically unsaturated compounds, which contain two sites of ethylenic unsaturation per molecule, trifunctional ethylenically unsaturated compounds, which contain three sites of ethylenic unsaturation per molecule, tetrafunctional ethylenically unsaturated compounds, which contain four sites of ethylenic unsaturation per molecule, and pentafunctional ethylenically unsaturated compounds, which contain five sites of ethylenic unsaturation per molecule. As will be appreciated, mixtures of two or more hydrophobic multi-functional ethylenically unsaturated compounds may be used in the compositions of the present invention.

Specific examples of hydrophobic bifunctional ethylenically unsaturated compounds, which are suitable for use in the present invention, include, without limitation, 1,3-butylene glycol di(meth)acrylate, 1,6-hexanediol di(meth)acrylate, neopentyl glycol di(meth)acrylate, bisphenol A di(meth) acrylate, bisphenol A glycidyl di(meth)acrylate, ethylene oxide-modified bisphenol A di(meth)acrylate, ethylene oxide-modified bisphenol A glycidyl di(meth)acrylate, 2,2-bis(4-methacryloxypropoxyphenyl)propane, 7,7,9-trimethyl-4,13-dioxa-3,14-dioxo-5,12-diazahexadecane-1,1,6-diol di(meth)acrylate, neopentyl glycol hydroxypivalate di(meth)acrylate, caprolactone-modified neopentyl glycol hydroxypivalate di(meth)acrylate, trimethylolethane di(meth)acrylate, trimethylolpropane di(meth)acrylate, and the like.

Specific examples of hydrophobic trifunctional or higher polyfunctional ethylenically unsaturated compounds that are suitable for use in the present invention include, but are not limited to, trimethylolmethane tri(meth)acrylate, trimethylolethane tri(meth)acrylate, trimethylolpropane tri(meth)acrylate, pentaerythritol tri(meth)acrylate, dipentaerythritol tri(meth)acrylate, di-trimethylolpropane tetra(meth)acrylate, pentaerythritol tetra(meth)acrylate, dipentaerythritol tetra(meth)acrylate, dipentaerythritol hexa(meth)acrylate, and the like.

In certain embodiments, the coating compositions of the present invention are substantially free, or, in some cases, completely free of monofunctional acrylates. As used herein, the term "monofunctional acrylate" refers to a molecule having one acrylate moiety. As used herein, the term "substantially free" means that the material being discussed is present in a composition, if at all, as an incidental impurity. In other words, the material does not affect the viscosity stability properties of the composition of the present invention. As used herein, the term "completely free" means that the material being discussed is not present in a composition at all.

In certain embodiments, the hydrophobic multi-functional ethylenically unsaturated compound is present in the coating compositions of the present invention in an amount of from 2 percent to 30 percent by weight, such as 5 to 15 percent by weight, with the weight percent being based on the total weight of the coating composition.

Certain embodiments of the waterborne coating compositions of the present invention also comprise a neutralizing agent comprising predominantly a monofunctional tertiary amine having a base strength, $pK_a$, of no more than 9.5, in some cases, no more than 8.5, and, in yet other cases, no more than 8.0. As used herein, when it is stated that the neutralizing agent comprises "predominantly" a monofunctional tertiary amine, it means that the amount of monofunctional tertiary amine used to solubilize the acid functional polymer is sufficient to produce a composition that is viscosity stable under alkaline conditions. In certain embodiments, this means that at least 50 percent by weight, in some cases at least 75 percent by weight, or, in yet other cases, at least 90 percent by weight, of the total amine in the composition is a monofunctional tertiary amine having a $pK_a$ of no more than 9.5.

Monofunctional tertiary amines having a $pK_a$ within the desired range, which are suitable for use in the present invention, include, but are not necessarily limited to, triallylamine, diallylmethylamine, benzyldimethylamine, n-allylmorpholine, propargyldimethylamine, propargylethyldimethylamine, n-methylmorpholine, n,n-dimethylhydroxylamine, allyldimethylamine, benzyldiethylamine, n-ethylmorpholine, propargymethyldimethylamine, including mixtures thereof.

In the compositions of the present invention, the neutralizing agent is present in an amount sufficient to neutralize the coating composition to a pH within the range of 7 to 9, such as 7.0 to 8.7, or, in some cases, 7.5 to 8.7.

The inventors have surprisingly discovered that the waterborne, radiation-curable compositions described herein are viscosity stable under alkaline conditions. As used herein, the term "alkaline conditions" means that the pH of the composition is within the range of 7 to 9, in some cases 7.5 to 8.7. As used herein, the term "viscosity stable" means that the viscosity of the composition does not increase by more than 50% of its original viscosity, in some cases not more than 25%, after being exposed to a temperature of 120° F. for a period of 28 days.

In certain embodiments, the initial viscosity of the composition is 100 to 300 centipoises (cps), such as 120 to 200 cps, at 77° F. (25° C.) and the final viscosity is 100 to 450 cps, such as 120 to 300 cps, at 77° F. (25° C.). As used herein, the term "final viscosity" refers to the viscosity of the composition after the composition has been exposed to a temperature of 120° F. for a period of 28 days. The viscosity values reported herein are measured according to the method described in the Examples.

In addition to the previously described components, the compositions of the present invention may include other components, such as, for example, free radical photoinitiators. Suitable free radical photoinitiators include, but are not limited to, benzophenones, acetophenone derivatives, such as alpha-hydroxyalkylphenylketones, benzoins such as benzoin alkyl ethers and benzyl ketals, monoacylphosphine oxides, and bisacylphosphine oxides. Free radical initiators are commercially available from, for example, Ciba Specialty Chemicals Corporation in their DURACURE and IRGACURE lines; IRGACURE 184, IRGACURE 500, and DURACURE 1173 are particularly suitable.

In certain embodiments, the radiation curable compositions of the present invention comprise 0.01 up to 15 percent by weight of free radical photoinitiator or, in some embodiments, 0.01 up to 10 percent by weight, or, in yet other embodiments, 0.01 up to 5 percent by weight of free radical photoinitiator based on the total weight of the composition.

In certain embodiments, the compositions of the present invention also comprise any of a variety of other additives, such as rheology modifiers, surfactants, UV-light stabilizer, dyes, pigments, sanding additives, antioxidants, solvents, and flatting agents (e.g. wax-coated or non-wax coated silica or other inorganic materials), among other materials.

In certain embodiments, the coating compositions of the present invention also include a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used in the compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The radiation curable compositions of the present invention may be applied directly onto the surface of a substrate or over an underlayer by any suitable coating process known to those of ordinary skill in the art, for example, by dip coating, direct roll coating, reverse roll coating, curtain coating, spray coating, brush coating, vacuum coating and combinations thereof. The method and apparatus for applying the composition to the substrate may be determined, at least in part, by the configuration and type of substrate material. Dry film thickness can range from, for example, about 0.1 to 3.0 mils (2.5 to 76.2 microns) per layer, such as 0.2 to 2.0 mils (5.1 to 50.8 microns) per layer or, in some embodiments, 0.2 to 1.0 mil (5.1 to 25.4 microns) per layer.

Suitable substrates include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding. In certain embodiments, such a substrate has been coated or treated with a wood stain and or toner prior to application of the compositions of the present invention.

Suitable metallic substrates include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in U.S. Pat. Nos. 4,157,924 and 4,186, 036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Examples of suitable silicatic substrates are glass, porcelain and ceramics.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates are grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminium tanned or semi-chrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminium derivatives, quebracho, chestnut or mimosa extracts, aromatic syntans, polyurethanes, (co) polymers of (meth) acrylic acid compounds or melamine/, dicyanodiamide/and/ or urea/formaldehyde resins.

Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include polystyrene foams, polymethacrylimide foams, polyvinylchloride foams, polyurethane foams, polypropylene foams, polyethylene foams, and polyolefinic foams. Example polyolefinic foams include polypropylene foams, polyethylene foams and/or ethylene vinyl acetate (EVA) foam. EVA foam can include flat sheets or slabs or molded EVA forms, such as shoe midsoles. Different types of EVA foam can have different types of surface porosity. Molded EVA can comprise a dense surface or "skin", whereas flat sheets or slabs can exhibit a porous surface.

Once applied, the compositions of the present invention can be cured by radiation. Thus, for example, the compositions of the present invention may be cured by, for example, irradiation with ultraviolet rays, electron beam radiation, as is known to those skilled in the art and described in the Examples. In certain embodiments, curing can be completed in less than one minute.

Illustrating the invention are the following examples that are not to be considered as limiting the invention to their details. All parts and percentages in the examples, as well as throughout the specification, are by weight unless otherwise indicated.

EXAMPLE 1

The coatings shown in Table I were prepared by adding weight in grams of each material under agitation and stirring until uniform. pH was measured using an Accumet Research model AR 15 pH meter. Viscosity was measured at 77° F. (25° C.) and 12 rpm using a Brookfield DV-II digital viscometer with a #52 spindle. Viscosities were measured initially and after samples were aged for 28 days at 120° F.

TABLE I

| Ingredient | Sample 1 | Sample 2 | Sample 3 |
| --- | --- | --- | --- |
| NeoCryl A-633[1] | 111.1 | 111.1 | |
| NeoCryl XK-220[2] | | | 99.23 |
| Deionized water | | | 15.53 |
| Igepal CO 430[3] | 0.23 | 0.23 | 0.22 |
| Rhodapex CO 436[4] | 0.38 | 0.38 | 0.37 |
| Ditrimethylol propane tetraacrylate | 22.86 | 22.86 | |
| Trimethylol propane triacrylate | | | 21.88 |
| Lux 440[5] | 50.72 | 50.72 | 48.28 |
| Deionized water | 21.41 | 21.41 | 19.99 |
| 2-butoxy ethanol | 5.12 | 5.12 | 5.00 |
| Deionized water | 10.08 | 10.08 | |
| n-methyl-2-pyrrolidone | 3.00 | 3.00 | 3.00 |
| Dipropylene glycol monomethyl ether | 2.00 | 2.00 | |
| DSX-1514[6] | 1.16 | 1.16 | 2.00 |
| Airex 902[7] | 0.78 | 0.78 | 0.74 |
| OK 520[8] | 1.09 | 1.09 | 1.18 |
| Tego Glide 440[9] | 0.66 | 0.66 | 0.64 |
| Foamex 822[10] | 1.30 | 1.30 | 1.25 |
| Irgacur 500[11] | 2.58 | 2.58 | 2.50 |
| Byk 348[12] | 1.30 | 1.30 | 1.25 |
| Deionized water | 14.22 | 14.22 | |
| n-ethyl morpholine | 2.2 | | 4.30 |
| Dimethyl ethanol amine | | 1.00 | |
| Deionized water | | | 19.99 |
| Testing | | | |
| Initial pH | 8.21 | 8.26 | 8.64 |
| Initial viscosity cps | 165 | 184 | 151 |
| 14 day heat aged viscosity cps | 217 | 466 | 143 |
| 28 day heat aged viscosity cps | 384 | Off scale | 197 |

[1]Acrylic emulsion from Neo Resins.
[2]Acrylic emulsion from Neo Resins.
[3]Nonionic wetting agent from Rhodia.
[4]Anionic surfactant from Rhodia.
[5]UV Crosslinkable dispersion from Alberdingk-Boley.
[6]Aqueous urethane emulsion from Cognis.
[7]Polyether siloxane emulsion from Tego Chemie.
[8]Amorphous precipitated silica from Degussa.
[9]Polyether modified siloxane from Degussa Goldschmidt.
[10]Polyether polysiloxane from Degussa Goldschmidt.
[11]Photoinitiator mixture from Ciba Additives.
[12]Polyether modified siloxane from Byk-Chemie.

Test Substrates

After 4 weeks aging at 120° F., Sample 3 was drawn down on a Leneta chart using a 046 wire wound bar, flashed 15 minutes at 120° F. and UV cured using 80 W/cm medium pressure mercury UV curing lamps (part no. 25-20008-E), available from Western Quartz Products, Inc. with 1000 mJ/cm$^2$ UVA as measured using a Power Puck radiometer. Stain marking of resultant cured film immediately after chemical spot testing is shown in Table II.

TABLE II

| Chemical | Stain |
| --- | --- |
| 1 hour spot with mustard | Slight mark |
| 24 hour spot with (50 weight % isopropanol in water) | Slight mark |
| 24 hour spot with concentrated lemon juice | No mark |

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

I claim:

1. A waterborne, radiation-curable coating composition comprising:
   (a) a water dispersible polymer comprising a carboxylic acid functional vinyl polymer having an acid number of 15 to 50;
   (b) a hydrophobic multi-functional ethylenically unsaturated compound; and
   (c) a neutralizing agent comprising a monofunctional tertiary amine having a $pK_a$ of no more than 9.5 and present in an amount of at least 50 percent by weight, based on the total amine in the composition;
   wherein the monofunctional tertiary amine neutralizes acid groups of the carboxylic acid functional vinyl polymer; wherein the coating composition has a pH of 7 to 9"; wherein the composition has an initial viscosity of 100 to 300 centipoise at 77° F. and a final viscosity of 100 to 450 cps at 77° F. and
   wherein the composition is cured by exposure to ultraviolet rays or electron beam radiation.

2. The coating composition of claim 1, wherein the composition comprises a carrier fluid that is at least 80 weight percent water.

3. The coating composition of claim 1, wherein the water dispersible polymer is present in the coating composition in an amount of from 5 percent to 50 percent by weight, based on the total weight of the coating composition.

4. The coating composition of claim 1, wherein the hydrophobic multi-functional ethylenically unsaturated compound comprises three or more sites of ethylenic unsaturation per molecule.

5. The coating composition of claim 3, wherein the hydrophobic multi-functional ethylenically unsaturated compound comprises trimethylolpropane tri(meth)acrylate.

6. The coating composition of claim 1, wherein the hydrophobic multi-functional ethylenically unsaturated compound is present in the coating composition in an amount of from 2 percent to 30 percent by weight, based on the total weight of the coating composition.

7. The coating composition of claim 1, wherein the neutralizing agent comprises n-ethylmorpholine.

8. A waterborne, radiation curable coating composition comprising:
   (a) a water dispersible polymer comprising a carboxylic acid functional vinyl polymer having an acid value of 15 to 50,
   (b) a hydrophobic multi-functional ethylenically unsaturated compound comprising trimethylolpropane tri(meth)acrylate and/or di-trimethylol propane tetra(meth)acrylate, and
   (c) a neutralizing agent comprising predominantly n-ethylmorpholine wherein the n-ethylmorpholine is present in an amount of at least 50 percent by weight, based on the total amine in the composition and neutralizes acid groups of the carboxylic acid functional vinyl polymer, and
   wherein the composition has a pH of 7 to 9 and is viscosity stable for at least 28days at 120° F., wherein the composition has an initial viscosity of 100 to 300 centipoise at 77° F. and a final viscosity of 100 to 450 centipoise at 77° F.; and
   wherein the composition is cured by exposure to ultraviolet rays or electron beam radiation.

9. The coating composition of claim 8, wherein the coating composition has a pH of 7.5 to 8.7.

10. The coating composition of claim 1, wherein the water dispersible polymer does not comprise polyurethane.

11. The coating composition of claim 1, wherein the water dispersible polymer consists of the carboxylic acid functional vinyl polymer.

12. The coating composition of claim 8, wherein the water dispersible polymer does not comprise polyurethane.

13. The coating composition of claim 8, wherein the water dispersible polymer consists of the carboxylic acid functional vinyl polymer.

14. The coating composition of claim 1, wherein the acid functional vinyl polymer has an acid number of 28 to 50.

15. The coating composition of claim 8, wherein the acid functional vinyl polymer has an acid number of 28 to 50.

16. The coating composition of claim 1, wherein the water dispersible polymer consists of a carboxylic acid functional vinyl polymer and, optionally, an acid functional polyolefin, an acid functional epoxy, an acid functional polyamide, a carboxylic acid functional polyester, or a mixture thereof.

17. The coating composition of claim 8, wherein the water dispersible polymer consists of a carboxylic acid functional vinyl polymer and, optionally, an acid functional polyolefin, an acid functional epoxy, an acid functional polyamide, a carboxylic acid functional polyester, or a mixture thereof.

18. The coating composition of claim 1, wherein the carboxylic acid functional vinyl polymer is:
   (a) the reaction product of a carboxylic acid functional ethylenically unsaturated monomer and an ethylenically unsaturated monomer that is free of carboxylic acid functionality; or
   (b) the reaction product of a hydroxy functional acrylic polymer and a cyclic anhydride.

19. The coating composition of claim 8, wherein the carboxylic acid functional vinyl polymer is:
   (a) the reaction product of a carboxylic acid functional ethylenically unsaturated monomer and an ethylenically unsaturated monomer that is free of carboxylic acid functionality; or
   (b) the reaction product of a hydroxy functional acrylic polymer and a cyclic anhydride.

* * * * *